(12) United States Patent
Szabo et al.

(10) Patent No.: US 6,827,686 B2
(45) Date of Patent: Dec. 7, 2004

(54) SYSTEM AND METHOD FOR IMPROVED HARMONIC IMAGING

(75) Inventors: Thomas L. Szabo, Newburyport, MA (US); Timothy J. Savord, Lowell, MA (US); Richard A. Snyder, Chester, NH (US); Richard F. Dillman, Andover, MA (US); Angel Ramon Martinez, Andover, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/225,008

(22) Filed: Aug. 21, 2002

(65) Prior Publication Data

US 2004/0039282 A1 Feb. 26, 2004

(Under 37 CFR 1.47)

(51) Int. Cl.[7] .................................................. A61B 8/14
(52) U.S. Cl. ...................................................... 600/458
(58) Field of Search ................................ 600/407–471; 367/7, 11, 130, 138; 73/602–630; 128/916

(56) References Cited

U.S. PATENT DOCUMENTS

| | | | |
|---|---|---|---|
| 4,222,274 A | 9/1980 | Johnson | 73/607 |
| 4,520,670 A | 6/1985 | Salomonsson et al. | 73/602 |
| 5,410,516 A | 4/1995 | Uhlendorf et al. | 367/7 |
| 5,531,117 A * | 7/1996 | Fortes | 73/602 |
| 5,675,554 A | 10/1997 | Cole et al. | 367/138 |
| 6,231,512 B1 | 5/2001 | Chiao et al. | |

* cited by examiner

Primary Examiner—Ali Imam
(74) Attorney, Agent, or Firm—John Vodopia

(57) ABSTRACT

Systems and methods for improving transducer response sensitivity in an ultrasound-imaging system are disclosed. One method includes selecting a desired transmit spectrum, quantifying the transmit channel impulse response, calculating a drive signal that when applied to the transmit channel will produce the desired transmit spectrum and applying the drive signal to the transducer. The method may be applied in principle to the receive channels. An improved ultrasound-imaging system in accordance with the invention includes a transducer and a switch controlled to apply an excitation signal to the transducer in a transmit mode of the ultrasound-imaging system. A signal shaper is configured to generate an excitation signal in response to the impulse response of the transmit channel such that a desired ultrasound energy waveform is generated by the transducer. An adaptable filter responsive to a desired echo spectrum and the impulse response of the receive channel of the system may be included.

18 Claims, 10 Drawing Sheets

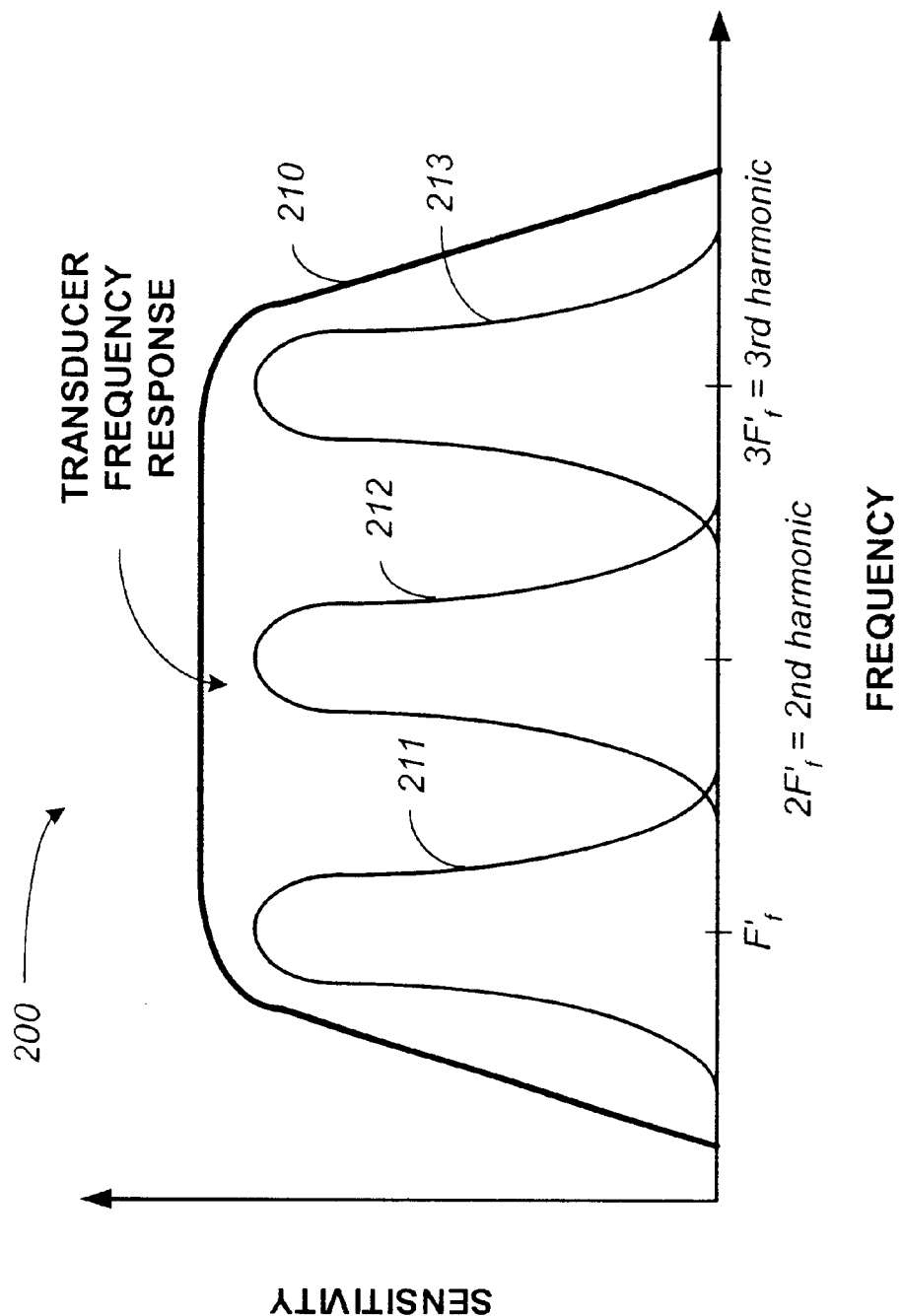

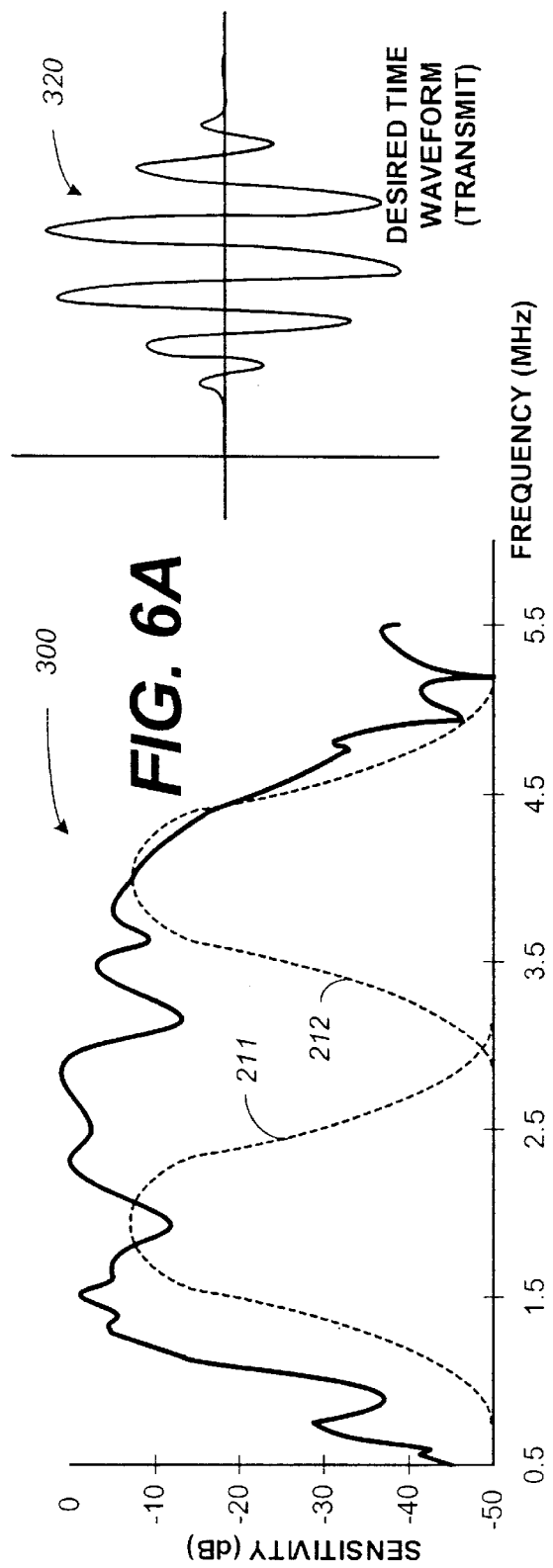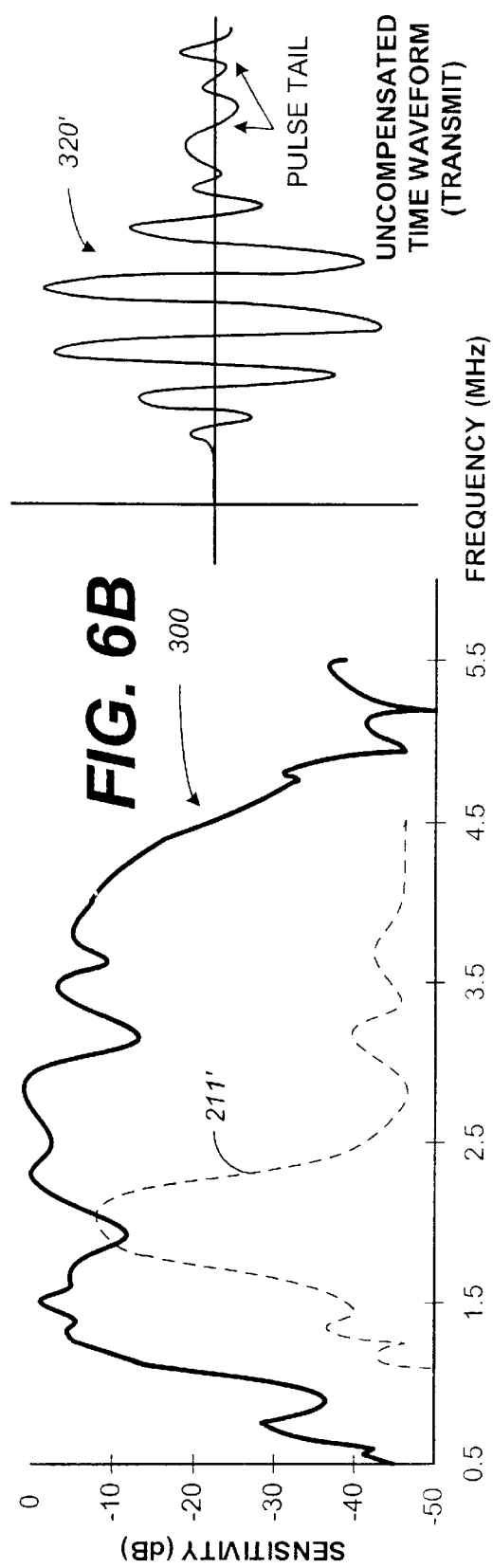

SYSTEM AND METHOD FOR IMPROVED HARMONIC IMAGING

TECHNICAL FIELD

The present disclosure relates to ultrasonic imaging. More particularly, systems and methods for improved axial resolution and increased sensitivity associated with a harmonic ultrasound imaging modality are disclosed.

DESCRIPTION OF THE RELATED ART

Ultrasonic imaging is used in many clinical applications because of its high image quality, safety, and low cost. Ultrasonic images are typically formed through the use of phased or linear-array transducers which are capable of transmitting and receiving pressure waves directed into a medium such as the human body. These ultrasonic transducers may be further assembled into a housing, which may contain control electronics, the combination of which forms an ultrasonic probe.

Ultrasonic probes are used along with transceivers to transmit and receive pressure waves through the various tissues of the body. The various ultrasonic responses are then processed by an ultrasonic-imaging system to display the various structures and tissues of the body.

Ultrasound imaging systems can create two-dimensional brightness or B-mode images of tissue in which the brightness of a pixel is based on the intensity of the received ultrasonic echoes. In another common imaging modality, typically known as color-flow imaging, the flow of blood or movement of tissue is observed. Color-flow imaging takes advantage of the Doppler effect to color-encode image displays. In color-flow imaging, the frequency shift of backscattered-ultrasound waves is used to measure the velocity of the backscatterers from tissues or blood. The frequency of sound waves reflecting from the inside of blood vessels, heart cavities, etc. is shifted in proportion to the velocity of the blood cells. The frequency of ultrasonic waves reflected from cells moving towards the transducer is positively shifted. Conversely, the frequency of ultrasonic reflections from cells moving away from the transducer is negatively shifted. The Doppler shift may be displayed using different colors to represent speed and direction of flow. To assist diagnosticians and operators, the color-flow image may be superimposed on the B-mode image.

Ultrasonic imaging can be particularly effective when used in conjunction with contrast agents. In contrast-agent imaging, gas or fluid filled micro-sphere contrast agents known as microbubbles are typically injected into a medium, normally the bloodstream. Due to their physical characteristics, contrast agents stand out in ultrasound examinations and therefore can be used as markers that identify the amount of blood flowing to or through the observed tissue. In particular, the contrast agents resonate in the presence of ultrasonic fields producing radial oscillations that can be easily detected and imaged. Normally, this response is imaged at the second harmonic, $2f_t$ of the fundamental or transmit frequency, $f_t$. By observing anatomical structures after introducing contrast agents, medical personnel can significantly enhance imaging capability for diagnosing the health of blood-filled tissues and blood-flow dynamics within a patient's circulatory system. For example, contrast-agent imaging is especially effective in detecting myocardial boundaries, assessing micro-vascular blood flow, and detecting myocardial perfusion.

U.S. Pat. No. 5,410,516 to Uhlendorf et al. discloses that a radio-frequency (RF) filter can be used to selectively observe any integer harmonic (2nd, 3rd, etc.), subharmonic (e.g., ½ harmonic) or ultraharmonic (e.g., 3/2 harmonic) of $f_t$ to improve the microbubble to tissue signal ratio. The second harmonic has proven most useful due to the large bubble response at this frequency as compared to higher-order integer harmonics, subharmonics or ultraharmonics. The second harmonic also is most practical due to bandwidth limitations on the transducer (i.e., <70% bandwidth, where percent bandwidth is defined as the difference of the high-corner frequency—6 dB point from the low-corner frequency—6 dB point, divided by the center frequency.) However, single-pulse excitation techniques together with harmonic imaging suffer from poor microbubble-to-tissue signal-intensity ratios as large fundamental signals ($f_t$) scattered from tissue mask the signals generated by the contrast agent.

As a result, of the discrimination problem associated with single-pulse excitation techniques, various multiple-pulse methodologies have been developed to suppress ultrasonic responses from anatomical tissues. These multiple-pulse excitation techniques result in diagnostic displays having an intensity that is responsive to the concentration of the contrast agent within the local insonified region.

Several techniques have been developed which take advantage of the primarily linear-response behavior of tissue to cancel or attenuate the linear-tissue signals. In several of these techniques, multiple transmit lines are fired along the same line of sight into the body. The transmit waveform is modified (e.g., in terms of power, phase, or polarity) from line to line to produce a variation in the response received by the transducer. These data points are then processed to remove the influence of their linear components to yield data that primarily contains the non-linear response of the contrast agents.

Although the above-described techniques work well in removing the influence of tissue generated signals, further improvements in resolution and system sensitivity are desired. Lateral resolution of a pulsed-echo ultrasound-imaging system depends on the ultrasonic-beam width. Axial resolution depends on the ultrasonic-pulse duration.

The lateral resolution may be improved by means of static or dynamic focusing using acoustic lenses or electronically focused transducer arrays. The width of the focused-ultrasonic beam is proportional to its wavelength or the frequency content of the transmit pulse.

The axial resolution may be improved by using high-frequency ultrasound or making the ultrasonic pulses shorter. However, high-frequency ultrasound pulses are limited in the depth of penetration due to tissue attenuation. Tissue attenuation increases with the frequency of the transmit pulses.

Generally, an ultrasound transducer is excited by an electronic waveform having a sharp voltage spike. In this case, the length of the transducer impulse response limits the duration of the ultrasonic pulse. Mechanical damping of the transducer further reduces the length of the impulse-response function. However, mechanical dampening sacrifices transducer bandwidth and sensitivity. Since it is common to use the same transducer for both transmitting ultrasonic pulses and receiving tissue-generated echoes, mechanical dampening is often an unacceptable solution as mechanical dampening generally limits transducer bandwidth.

To overcome the problems associated with high-frequency transmissions and the desire to shorten the length of the impulse response of the transducer, some have modified the excitation or transmit waveform that is applied to the transducer. The shape of the excitation waveform ultimately determines the shape and duration of the associated transmitted ultrasonic pulse.

Attempts to control the transmitted ultrasonic pulse waveform can be traced in the following patents. In U.S. Pat. No. 4,222,274 to Steven A. Johnson (1978), an apparatus is proposed that is capable of transmitting ultrasonic beams of two predetermined shapes. In U.S. Pat. No. 4,520,670 to Goran Salomonsson et al. (1982), a method and an apparatus is proposed for generating short-ultrasonic pulses by means of an excitation signal shaped as a weighted least-squares filter. Another system including a complex beamformer is described in U.S. Pat. No. 5,675,554 to Christopher R. Cole et al. (1996). The complex beamformer of Cole et al. is capable of producing focused-ultrasonic beams having a specified-carrier frequency and envelope.

Nevertheless, it is still desirable to be able to produce ultrasonic pulses having a variety of precisely-specified waveforms including those which can not be specified in terms of carrier frequency and envelope. Because of the limited available transducer bandwidth, the following problems arise for harmonic imaging. Because of the spectral falloff, both the transmitted and received signals have reduced sensitivity over the maximum-available transducer bandwidth. The limited transducer bandwidth also constrains both the transmitted and received-pulse frequency bandwidths to narrow ranges that fall within the available-transducer bandwidth when conventional-uncompensated transmission methods are used.

Furthermore, the transmitted pulses, when generated by a conventional means such as a tone-burst excitation, result in spectral sidelobes, which spill into the overlap region of the transmitted and received spectra. The sidelobes undesirably distort the response and the resultant image.

Moreover, the spectral-transducer amplitude and phase response distorts both the excitation transmissions and the received echoes so that the frequency spectrum associated with both the transmissions and the echoes are asymmetric.

SUMMARY OF THE INVENTION

A transmit-signal modifier reduces the aforementioned problems associated with limited-transducer bandwidth by compensating for the transducer response on transmit and/or receive and provides a method for realizing preferred-signal shapes for enhanced-harmonic imaging. A transmit-signal modifier may include a transmit controller having a digital-signal processor configured to calculate a drive spectrum that takes into account the impulse response of the ultrasound-transmit system. The digital-signal processor is further configured to determine a temporal-drive signal that results in the preferred transmit-spectrum shape when the drive signal is applied to the ultrasound transducer.

The digital-signal processor may employ inverse-Fourier transform methods including an inverse Fast-Fourier transform. The digital-signal processor may also employ alternative deconvolution methods to derive the transducer-compensated drive spectrum.

An echo-signal shaper may be realized with a receive filter having a center frequency at a designated harmonic of the transmit pulse center frequency. The receive filter may be adapted to a preferred receive-signal spectra and the impulse response of the ultrasound system including the transducer over the desired receive bandwidth. The required receive filter may be implemented by various deconvolution methods.

A method for enhancing the axial resolution and sensitivity of an ultrasound-imaging system is also disclosed. In its broadest terms, the method can be implemented by performing the following steps: selecting a preferred spectral shape of the acoustic ultrasound-transmit spectrum; identifying the impulse response of the transducer over the transmit spectrum; deriving a transmit-drive spectrum shape; determining the temporal-drive signal from the derived transmit-drive spectrum; and applying the temporal-drive signal.

The designated waveform will determine the frequency spectrum and the time duration of the transmitted-ultrasonic pulse thus enabling the use of the same transducer for different applications such as near field and far-field examinations. The precise shape of the transmitted ultrasonic-excitation signal can be selected to facilitate image-reconstruction techniques such as deconvolution or wavelet transform resulting in improved-axial resolution and superior-image quality. Similarly, by compensating for the adverse affects of the transducer-impulse response on the received echoes, a more accurate rendition of the tissues under observation can be attained.

Other features and advantages of the system and method for improved harmonic imaging will become apparent to one skilled in the art upon examination of the following drawings and detailed description. It is intended that all such additional features and advantages be included herein as protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 4B is a schematic diagram illustrating an alternative harmonic-imaging modality that may be implemented by the ultrasound-imaging system of FIG. 2.

FIGS. 6A–6C present a series of frequency and time plots illustrating the application and manipulation of a transmit-pulse spectrum that may be implemented by the ultrasound-imaging system of FIG. 2.

DETAILED DESCRIPTION OF THE PREFERRED EMBODIMENT

The present disclosure generally relates to harmonic imaging. A transmit-signal modifier accounts for the impulse response of the transducer and its associated electronics. The transmit-signal modifier may be applied such that impulse response effects introduced by the transmit channel and the transducer are reduced. The transmit-signal modifier modifies and transmits an electrical waveform that when applied at the transducer generates a desired ultrasound transmit-frequency spectrum. The transmit-signal modifier also improves axial resolution by shortening the duration of the temporal or time-domain transmit pulse. An ultrasound-imaging system having a signal shaper reduces fundamental or transmit-signal noise in the receive spectrum. Moreover, the transmit-signal modifier results in a more accurate rendition of the tissue observed.

The transmit-signal modifier may be applied such that impulse response effects introduced by the receive channel and the transducer are reduced from a desired receive-frequency spectrum that is centered about a harmonic of the transmit-frequency spectrum. A transmit-channel signal modifier may be implemented separately, or in combination with, a receive channel or echo-signal shaper.

Figure 1:
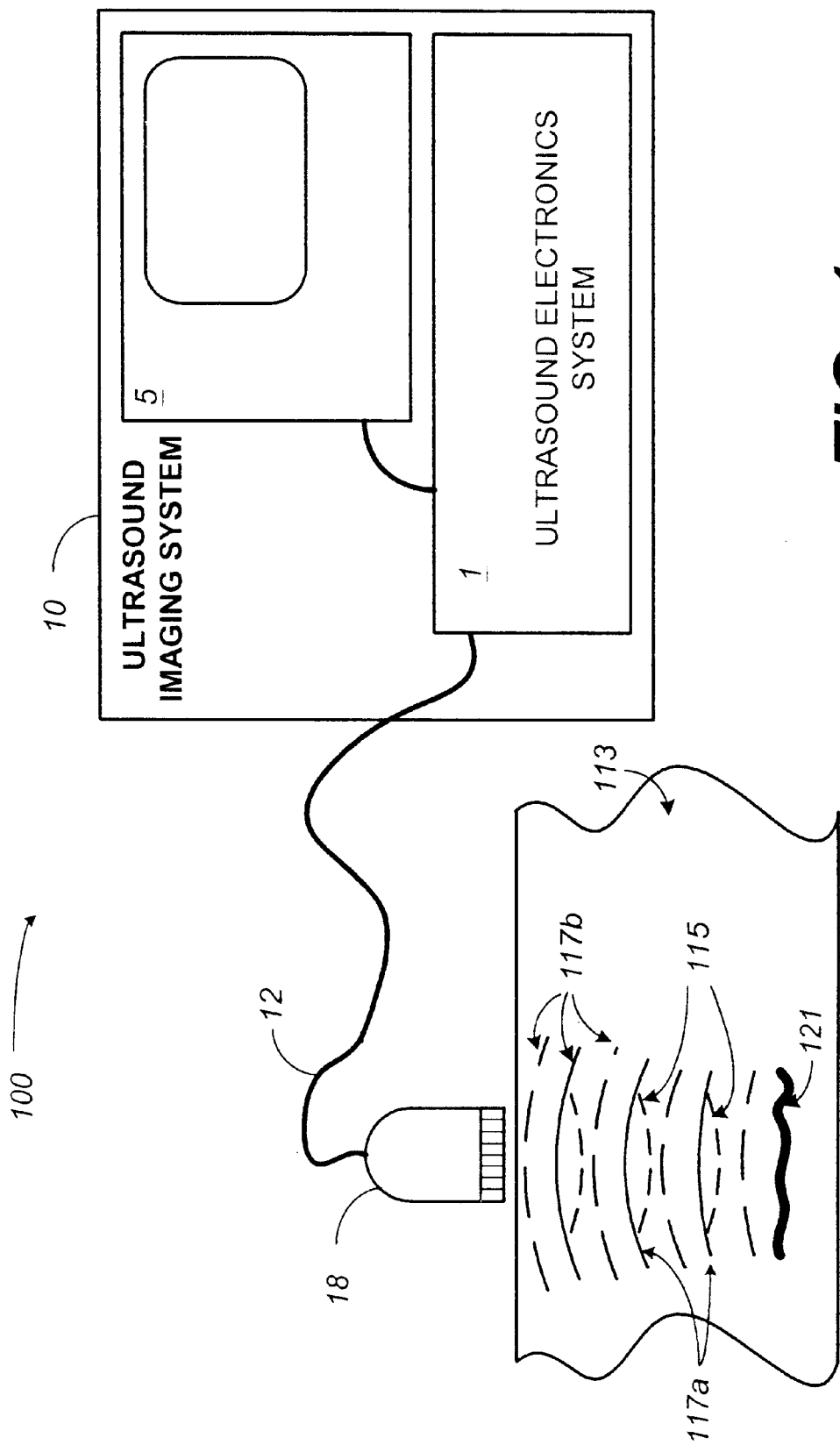
FIG. 1 is a schematic diagram of an exemplary diagnostic-imaging environment.

Referring to the drawings, attention is directed to FIG. 1, which illustrates a general diagnostic environment where an improved ultrasound-imaging system may implement the various methods enclosed herein to improve harmonic ultrasound-imaging modalities. In this regard, the general diagnostic environment is illustrated by way of a schematic diagram in FIG. 1 and is generally denoted by reference numeral 100. As illustrated in FIG. 1, an ultrasound-imaging system 10 may be disposed in a diagnostic environment 100 that includes a patient under test 113, a transducer 18, and an interface cable 12.

As shown in FIG. 1, the transducer 18 is placed into position over a portion of the anatomy of a patient under test 113 by a user/operator (not shown) of the ultrasound-imaging system 10. As is further shown in FIG. 1, a plurality of transmit signals are generated within the ultrasound-electronics system 1 and conveyed to the transducer 18 via the interface cable 12. The plurality of transmit signals is converted within the transducer 18 to a plurality of transmit pulses 115 (i.e., ultrasound-energy pulses) that emanate from the face of the transducer 18 in response to the applied transmit signals. The ultrasound-electronics system 1, interface cable 12, and transducer 18 together define a plurality of transmit channels.

When the transmit pulses 115 (in the form of ultrasound energy) encounter a tissue layer of the patient under test 113 that is receptive to ultrasound insonification, the multiple transmit pulses 115 penetrate the tissue layer 113. As long as the magnitude of the multiple ultrasound pulses exceeds the attenuation affects of the tissue layer 113, the multiple ultrasound pulses 115 will reach an internal target 121. Those skilled in the art will appreciate that tissue boundaries or intersections between tissues with different ultrasonic impedances will develop ultrasonic responses at the fundamental or transmit frequency, $f_t$, of the plurality of ultrasound pulses 115. Tissue insonified with ultrasonic pulses will develop fundamental-ultrasonic responses that may be distinguished in time from the transmit pulses to convey information from the various tissue boundaries within a patient.

Those ultrasonic reflections 117a, 117b of a magnitude that exceed that of the attenuation affects from traversing tissue layer 113 may be monitored and converted into an electrical representation of the received ultrasonic echoes by the ultrasound-electronics system 1. The ultrasound-electronics system 1 and a display-electronics system 5 may work together to produce an ultrasound-imaging display derived from the plurality of ultrasonic echoes 117.

Those skilled in the art will appreciate that those tissue boundaries or intersections between tissues with different ultrasonic impedances will develop ultrasonic responses at both the fundamental frequency, $f_t$, as well as, at harmonics (e.g., $2f_t$, $3f_t$, $4f_t$, etc.) of the fundamental frequency of the plurality of ultrasound pulses 115. Tissue insonified with ultrasonic pulses 115 will develop both fundamental 117a and harmonic-ultrasonic responses 117b that may be distinguished in time from the transmit pulses 115 to convey information from the various tissue boundaries within a patient. It will be further appreciated that tissue insonified with ultrasonic pulses 115 develops harmonic responses 117b because the compressional portion of the insonified waveforms travels faster than the rarefactional portions. The different rates of travel of the compressional and the rarefactional portions of the waveform causes the wave to distort producing a harmonic signal, which is reflected or scattered back through the various tissue boundaries.

Preferably, the ultrasound-imaging system 10 transmits a plurality of ultrasound pulses 115 at a fundamental frequency and receives a plurality of ultrasound-echo pulses or receive pulses 117 at an integer harmonic of the fundamental frequency. Those skilled in the art will appreciate that harmonic responses 117b may be received by a transducer 18 having an appropriately wide bandwidth to simultaneously transmit at a fundamental frequency and receive associated responses at a harmonic frequency thereof.

As further illustrated in FIG. 1, ultrasonic echoes 117a and 117b reflect fundamental responses and harmonic responses, respectively. It is significant to note that while FIG. 1 illustrates a second-harmonic response to the incident multiple ultrasound-transmit pulses 115 impinging the internal target 121 other harmonic responses may also be observed. As by way of example, it is known that subharmonic, harmonic, and ultraharmonic responses may be created at the tissue boundary between a tissue layer 113 and the internal target 121, when the internal target has been perfused with one or more contrast agents. The internal target 121 alone will produce harmonic responses at integer multiples of the fundamental frequency. Various contrast agents on the other hand, have been shown to produce subharmonic, harmonic, and ultraharmonic responses to incident ultrasonic pulses. Those ultrasonic reflections of a magnitude that exceed that of the attenuation affects from traversing the tissue layer 113 (e.g., fundamental, subharmonic, harmonic, and ultraharmonic responses) may be monitored and converted into an electrical signal by the combination of the transducer 18, the interface cable 12, and the ultrasound-electronics system 1 as will be explained in further detail below.

Ultrasound-Imaging System Architecture and Operation

The architecture of an ultrasound-imaging system 10 capable of practicing the various harmonic-imaging methods disclosed below is illustrated by way of a functional block diagram in FIG. 2 and is generally denoted by reference numeral 10. Note that many of the functional blocks illustrated in FIG. 2 define a logical function that can be implemented in hardware, software, or a combination thereof. For purposes of achieving high speed, it is preferred, at present, that most of the blocks be implemented in hardware, unless specifically noted hereafter. It will be appreciated that this figure does not necessarily illustrate every component of the system, emphasis instead being placed upon the components relevant to the methods disclosed herein.

Figure 2:
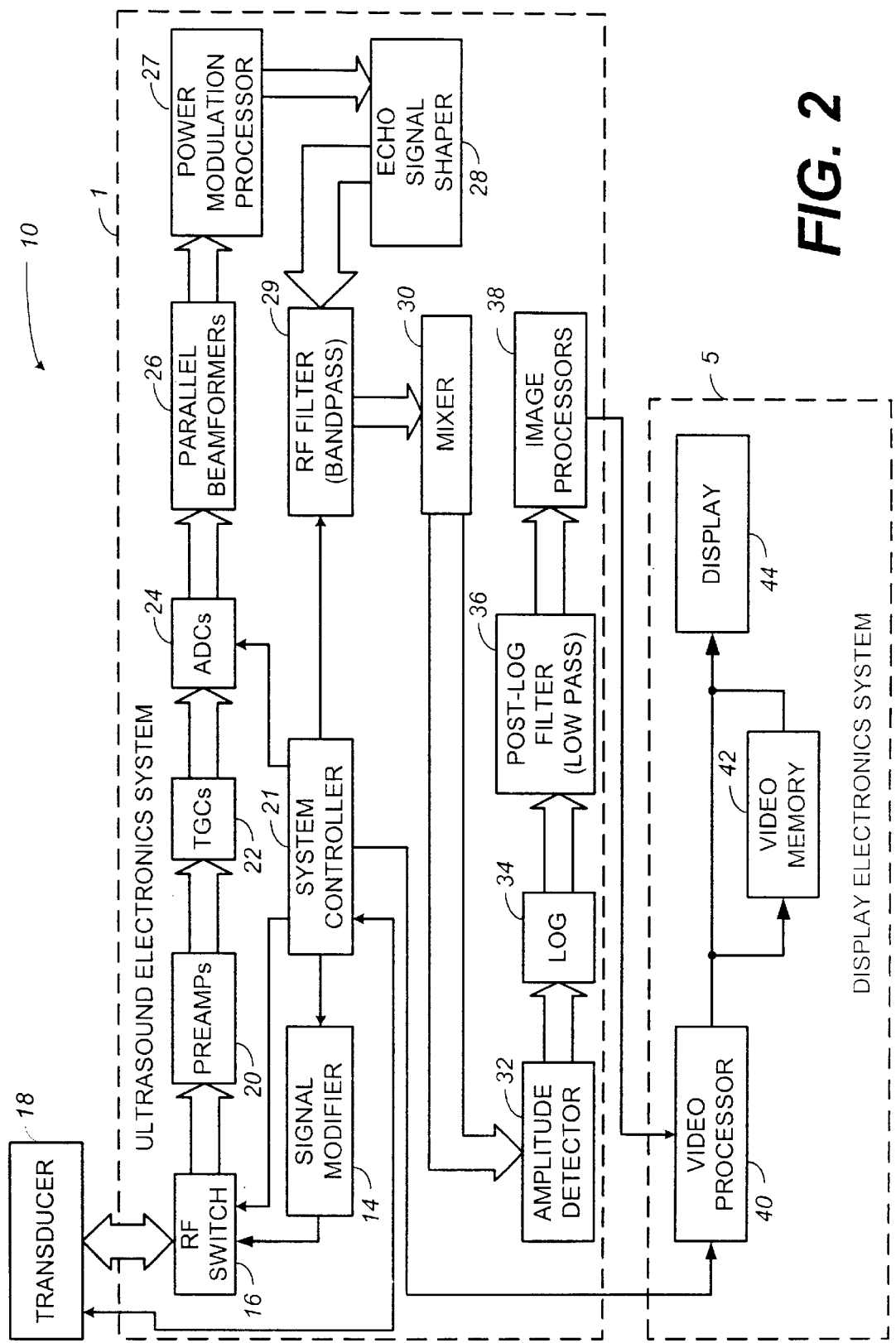
FIG. 2 is a functional block diagram of the improved ultrasound-imaging system of FIG. 1.

Referring to FIG. 2, the ultrasound-imaging system 10 may include an ultrasound-electronics system 1 in communication with a transducer 18 and display-electronics system 5. As illustrated in FIG. 2, the ultrasound-electronics system 1 may include a system controller 21 designed to control the operation and timing of the various elements and signal flow within the ultrasound-imaging system 10 pursuant to suitable software and/or firmware. The ultrasound-electronics system 1 may further comprise a transmit-signal modifier 14, a radio-frequency (RF) switch 16, a plurality of preamps 20, time-gain compensators (TGCs) 22, and analog-to-digital converters (ADCs) 24. In addition, the ultrasound-electronics system 1 may comprise a plurality of parallel beamformers 26, a power-modulation processor 27, an echo-signal shaper 28, a RF filter 29, a mixer 30, an amplitude detector 32, a log mechanism 34, a post-log filter 36, and one or more image processors 38. As further illustrated in FIG. 2, the display-electronics system 5 may comprise a video processor 40, a video-memory device 42, and a display 44.

The transducer 18 may take the form of a phased-array transducer having a plurality of elements both in the lateral and elevation directions. The plurality of transducer elements may be constructed of a piezoelectric material, for example, but not limited to, lead-zirconate-titanate (PZT). Each element may be selectively supplied with an electrical pulse or other suitable electrical waveform, causing the elements to collectively propagate an ultrasound-pressure wave into the object under test. Moreover, in response thereto, one or more echoes are reflected by the object under test and are received by the transducer 18, which transforms the echoes into an electrical signal for detection and processing within the ultrasound-electronics system 1.

The array of elements associated with the transducer 18 enable a beam, emanating from the transducer array, to be steered (during transmit and receive modes) through the object by delaying the electrical pulses supplied to the separate elements. When a transmit mode is active, an analog waveform is communicated to each transducer element, thereby causing a pulse to be selectively propagated in a particular direction, like a beam, through the object.

When a receive mode is active, a waveform is sensed or received at each transducer element at each beam position. Each analog waveform essentially represents a succession of echoes received by the transducer element over a period of time as echoes are received along the single beam through the object. Time delays are applied to the signals from each element to form a narrow receive beam in the desired direction. The entire set of analog waveforms formed by both transmit and receive mode manipulations represents an acoustic line, and the entire set of acoustic lines represents a single view, or image, of an object commonly referred to as a frame.

As is known, a phased-array transducer may comprise a host of internal electronics responsive to one or more control signals that may originate within the system controller 21 or alternatively in the transmit-signal modifier 14. For example, the transducer electronics may be configured to select a first subset of transducer elements to apply an excitation signal to generate a plurality of ultrasonic pulses. In a related manner, the transducer electronics may be configured to select a second subset of transducer elements to receive ultrasonic echoes related to the transmitted-ultrasonic pulses. Each of the aforementioned transducer-element selections may be made by the transducer 18 in response to the one or more control signals originating in the transmit-signal modifier 14 or the system controller 21.

As illustrated in FIG. 2, the transmit-signal modifier 14 may be electrically connected to the transducer 18 via a RF switch 16. The transmit-signal modifier 14 may be in further communication with the system controller 21. The system controller 21 may be configured to send one or more control signals to direct operation of the transmit-signal modifier 14. In response, the transmit-signal modifier 14 may generate a series of electrical pulses that may be periodically communicated to a portion of the array of elements of the transducer 18 via the RF switch 16, causing the transducer elements to emit ultrasound signals into the object-under-test of the nature described previously. The transmit-signal modifier 14 typically provides separation between the pulsed transmissions to enable the transducer 18 to receive echoes from the object during the period between transmit pulses and forwards them onto a set of parallel analog preamplifiers 20, herein labeled, "PREAMPs." The RF switch 16 may be configured to direct the various transmit and receive-electrical signals to and from the transducer 18.

The plurality of preamplifiers 20 may receive a series of analog electrical-echo waveforms from the transducer 18 that are generated by echoes reflected from the object-under-test. More specifically, each preamplifier 20 receives an analog electrical-echo waveform from a corresponding set of transducer elements for each acoustic line. Moreover, the set of preamplifiers 20 receives a series of waveform sets, one set for each separate acoustic line, in succession over time and may process the waveforms in a pipeline-processing manner. The set of preamplifiers 20 may be configured to amplify the echo waveforms to provide amplified-echo waveforms to enable further signal processing, as described hereafter. Because the ultrasound signals received by the transducer 18 are of low power, the set of preamplifiers 20 should be of sufficient quality that excessive noise is not generated in the process.

Because the echo waveforms typically decay in amplitude as they are received from progressively deeper depths in the object under test, the plurality of analog preamplifiers 20 in the ultrasound-electronics system 1 may be connected respectively to a parallel plurality of TGCs 22, which are known in the art and are designed to progressively increase the gain of each acoustic line received over time, thereby reducing the dynamic range requirements on subsequent processing stages. Moreover, the set of TGCs 22 may receive a series of waveform sets, one set for each separate acoustic line, in succession over time and may process the waveforms in a pipeline processing manner.

A plurality of parallel analog-to-digital converters (ADCs) 24 may be in communication respectively with the plurality of TGCs 22, as shown in FIG. 2. Each of the ADCs 24 may be configured to convert its respective analog-echo waveform into a digital-echo waveform comprising a number of discrete-location points (hundreds to thousands; corresponding with depth and may be a function of ultrasound transmit frequency or time) with respective quantized instantaneous-signal levels, as is well known in the art. In prior art ultrasound-imaging systems, this conversion often occurred later in the signal-processing steps, but now, many of the logical functions that are performed on the ultrasonic signals can be digital, and hence, the conversion is preferred at an early stage in the signal-processing process. Similar to the TGCs 22, the plurality of ADCs 24 may receive a series of waveforms for separate-acoustic lines in succession over time and process the data in a pipeline-processing manner. As an example, the system may process signals at a clock rate of 40 MHz with a B-mode frame rate of 60 Hz.

A set of parallel beamformers 26 may be in communication with the plurality of ADCs 24 and may be designed to receive the multiple digital-echo waveforms (corresponding with each set of transducer elements) from the ADCs 24 and combine them to form a single acoustic line. To accomplish this task, each parallel beamformer 26 may delay the separate echo waveforms by different amounts of time and then may add the delayed waveforms together, to create a composite digital RF acoustic line. The foregoing delay and sum beamforming process is well known in the art. Furthermore, the parallel beamformer 26 may receive a series of data collections for separate acoustic lines in succession over time and process the data in a pipeline-processing manner.

A power-modulation processor 27 may be coupled to the output of the parallel beamformers 26 and may be configured to receive and process a plurality of digital-acoustic lines in succession. The power-modulation processor 27 may be configured to work in concert with the system controller 21 or the transmit-signal modifier 14 to selectively process a plurality of digital-acoustic lines with multiple levels of ultrasound insonification. An example of an ultrasound-imaging system 100 for producing a series of ultrasonic pulses with multiple-excitation levels is disclosed in U.S. Pat. No. 5,577,505 which shares a common assignee with the present application and the contents of which are incorporated herein in their entirety. As further illustrated in the functional block diagram of FIG. 2, the echo-signal shaper 28, the operation of which will be explained below, may be applied between the power modulation processor 27 and the RF filter 29. The RF filter 29 may take the form of a bandpass filter configured to receive each digital-acoustic line and to remove undesired out-of-band noise. As further illustrated in FIG. 2, a mixer 30 may be coupled at the output of the RF filter 29. The mixer 30 may be designed to process a plurality of digital-acoustic lines in a pipeline manner. The mixer 30 may be configured to combine the filtered digital-acoustic lines from the RF filter 29 with a local oscillator signal (not shown for simplicity) to ultimately produce a plurality of baseband digital-acoustic lines.

Preferably, the local oscillator signal is a complex signal, having an in-phase signal (real) and a quadrature-phase signal (imaginary) that are ninety degrees out-of-phase. The mixing operation may produce sum and difference-frequency signals. The sum-frequency signal may be filtered (removed), leaving the difference-frequency signal, which is a complex signal at near zero frequency. A complex signal is desired to follow direction of movement of anatomical structures imaged in the object-under-test, and to allow accurate, wide-bandwidth amplitude detection.

Up to this point in the ultrasound echo-receive process, all operations can be considered substantially linear, so that the order of operations may be rearranged while maintaining substantially equivalent function. For example, in some systems it may be desirable to mix to a lower intermediate frequency (IF) or to baseband before beamforming or filtering. Such rearrangements of substantially linear-processing functions are considered to be within the scope of this invention.

An amplitude detector 32 may receive and process, in pipeline manner, the complex-baseband digital-acoustic lines from the mixer 30. For each complex-baseband digital-acoustic line, the amplitude detector 32 may analyze the envelope of the line to determine the signal intensity at each point along the acoustic line to produce an amplitude-detected digital-acoustic line. Mathematically, this means that the amplitude detector 32 determines the magnitude of each phasor (distance to origin) corresponding with each point along the acoustic line.

A log mechanism 34 may receive the amplitude-detected digital-acoustic lines in a pipeline-processing manner, from the amplitude detector 32. The log mechanism 34 may be configured to compress the dynamic range of the data by computing the mathematical logarithm (log) of each acoustic line to produce a compressed digital-acoustic line for further processing. Implementation of a log function enables a more realistic view, ultimately on a display, of the change in brightness corresponding to the ratio of echo intensities.

A post-log filter 36, usually in the form of a low-pass filter, may be coupled to the output of the log mechanism 34 and may be configured to receive the compressed digital-acoustic lines in a pipeline fashion. The post-log filter 36 may remove or suppress high frequencies associated with the compressed digital-acoustic lines to enhance the quality of the display image. Generally, the post-log filter 36 softens the speckle in the displayed image. The low-pass post-log filter 36 can also be configured to perform anti-aliasing. The low-pass post-log filter 36 can be designed to essentially trade spatial resolution for gray-scale resolution.

One or more image processors 38 may be coupled to the output of the low-pass post-log filter 36. Each of the image processors 38 may further comprise a suitable species of random-access memory (RAM) and may be configured to receive the filtered digital-acoustic lines from the low-pass post-log filter 36. The acoustic lines can be defined within a two-dimensional coordinate space. The image processors 38 may be configured to mathematically manipulate image information within the received and filtered digital-acoustic lines. In addition, each of the image processors 38 may be configured to accumulate acoustic lines of data over time for signal manipulation. In this regard, the image processors 38 may further comprise a scan converter to convert the data as stored in the RAM to produce pixels for display. Each scan converter may process the data in the RAM once an entire data frame (i.e., a set of all acoustic lines in a single view, or image/picture to be displayed) has been accumulated by the RAM. For example, if the received data is stored in RAM using polar coordinates to define the relative location of the echo information, the scan converter may convert the polar-coordinate data into rectangular-data (i.e., orthogonal data) capable of raster scan via a raster-scan capable processor. The ultrasound-electronics system 1, having completed the receiving, echo recovery, and image-processing functions, to form a plurality of image frames associated with the plurality of ultrasound-image planes, may forward the echo-image data information associated with each image frame to a display-electronics system 5 as illustrated in FIG. 2.

The display-electronics system 5 may receive the echo-image data from the ultrasound-electronics system 1, where the echo-image data may be forwarded to a video processor 40. The video processor 40 may be designed to receive the echo-image data information and may be configured to raster scan the image information. The video processor 40 outputs picture elements (e.g., pixels) for storage in a video memory device 42 and/or for display via a display 44. The video-memory device 42 may take the form of a digital-videodisc (DVD) player/recorder, a compact-disc (CD) player/recorder, a video-cassette recorder (VCR), or other video-information storage device. As is known in the art, the video-memory device 42 permits viewing and or post-data collection image processing by a user/operator in other than real-time.

A conventional display device in the form of a display 44 may be in communication with both the video processor 40 and the video memory 42 as illustrated in FIG. 2. The display 44 may be configured to periodically receive the pixel data from either the video memory 42 and or the video processor 40 and drive a suitable screen or other imaging device (e.g., a printer/plotter) for viewing of the ultrasound image by a user/operator.

Figure 3:
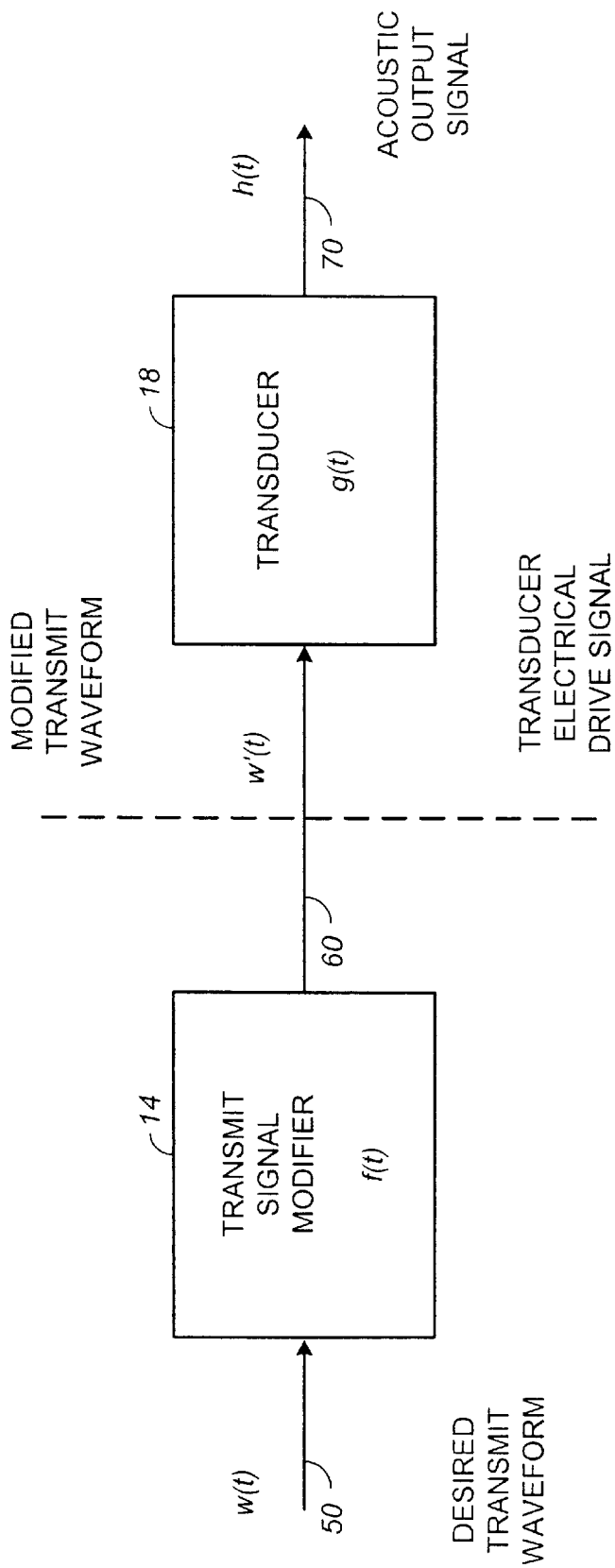
FIG. 3 is a schematic block diagram illustrating a transmit-signal modifier that may be implemented by the ultrasound-imaging system of FIG. 2.

It is known in the art that an ultrasonic transducer can be treated as a linear system with the impulse-response function, g(t). This relationship is shown in the block diagram of FIG. 3. As shown in FIG. 3, a transmit-signal modifier 14 may be introduced before the transducer 18 is the transmit channel of the ultrasound-electronics system 1. The transmit-signal modifier 14 may be modeled by a transfer function f(t). As shown in FIG. 3, the transmit-signal modifier 14 receives a desired transmit waveform, w(t), via input 50 and produces a modified-transmit waveform, w'(t), at output 60. Output 60 is electrically coupled to the input of the transducer 18. As further illustrated in the block diagram of FIG. 3, when the transmit-signal modifier 14 generates and forwards the modified-transmit waveform 60, w'(t), to the transducer 18, the transducer produces an acoustic-output signal, h(t), represented schematically by arrow 70 that may be represented mathematically by the following relationship:

$$h(t)=w(t)*g(t),\qquad\text{Eq. 1}$$

where, "*," indicates convolution. Therefore, for the ultrasound-imaging system 10 to produce the desired acoustic-output waveform, h(t), the ultrasound-electronics system 1 should forward the following a modified-input signal to the transducer 18:

$$w'(t)=w(t)*f(t),\qquad\text{Eq. 2}$$

According to equations 1 and 2, a system having the impulse response, g(t), excited by an input signal modified by a filter, f(t), will produce the desired acoustic waveform:

$$h(t)=w(t)*g(t)=x(t)*f(t)*g(t)\qquad\text{Eq. 3}$$

A shaping-filter function, f(t), can be obtained by solving the general deconvolution problem. A first method for resolving the filter function, employs an inverse-Fourier transform, $F^{-1}$, such that $f(t)=F^{-1}\{F\{f(t)\}\}$, where $F\{f(t)\}$ is the forward-Fourier transform. Thus, $$f(t)=F^{-1}(1/F(g)).\qquad\text{Eq. 4}$$

As a result of the above relationships, if a one-way complex-transducer spectrum (as determined by measurement or calculation as a result of excitation by an impulse drive), $X(f-f_1)$, and the preferred acoustic transmit-drive spectrum is represented as $T(f-f_1)$, then the actual transducer electrical-drive spectrum required to achieve the preferred acoustic transmit-drive spectrum, $D(f-f_1)$, may be determined as D=T/X. As described above, a temporal-drive signal can be determined from the drive spectrum D by inverse-Fourier transform methods such as an inverse Fast-Fourier Transform. It should be appreciated that alternative deconvolution methods can also be used to determine the transducer-compensated actual-drive spectrum such as Weiner filter or polynomial time-division deconvolution. The aforementioned methods, among others, may be implemented by an appropriately configured digital-signal processor in cooperation with one or more memory devices within the transmit-signal modifier 14 of the ultrasound-electronics system 1. Each of the methods will yield substantially similar results and can be applied to discrete, digitally sampled signals.

In the discrete domain, the impulse-response function of the transducer 18, g(t), is sampled on m evenly spaced points over the time interval of the transducer impulse-response duration. The desired waveform w(t) can be specified as a set of n evenly spaced points over the time interval of its duration. For simplicity, both functions may be sampled with the same frequency and contain the same number of sample points, m. Note that a function of short duration may be concatenated with trailing samples of zero.

The effectiveness of the transmit-signal modifier 14 in generating the necessary actual output, w'(t) can be improved by sampling w(t) and g(t) more accurately (i.e., using more sampling points) and increasing the order of the filter. It should be appreciated that the overall effectiveness of the transmit-signal modifier 14 depends on the impulse response g(t) of the ultrasound-electronics system 1, the interface cable 12, and the transducer 18 under consideration, the desired output w(t) and the order of the approximated drive signal (i.e., on the transmit channel) and/or the order of the receive filters. In general, higher-order filters are directly related to the effectiveness of the impulse-response compensation.

By compensating for the effect of the transducer spectrum on the acoustic-transmit signal and adjusting the applied-drive signal, the fall off in transducer-response sensitivity as a function of frequency can be overcome so that the overall combined response of the transducer and drive signal has the effect of extending the available transducer bandwidth. Furthermore, an acoustic-transmitted spectrum of a desired symmetric shape can be achieved by compensating for the frequency response of the transducer 18.

To a first approximation, an observed frequency spectrum of a generated harmonic waveform (i.e., an echo response) is similar in shape and bandwidth to the transmitted spectrum. However, the center frequency of the received harmonic waveform is translated to the corresponding harmonic multiple, $Nf_t$, where N is an integer representing the harmonic number and $f_t$ is the center frequency of the transmit-spectrum (i.e., the fundamental center frequency). The received harmonic spectrum will also be adversely affected by the impulse response of the transducer 18 and the receive-channel electronics over the receive-channel frequency range.

To reduce the undesired effects of the impulse response of the transducer 18 and system electronics, the echo-signal shaper 28 may also contain a receive filter. To construct the receive filter, a desired receive-filter function, R, such as a Gaussian function, is selected with a center frequency at the harmonic multiple center frequency, $Nf_t$. Then, the actual filter $F[Nf_t]$ may be derived by a similar deconvolution method, as that described above for the transmit pulse, where F=R/X.

The effect of the transducer response-compensated receive filter is to extend the effective bandwidth and sensitivity of the received signal-transducer response combination. It is significant to note that a composite-signal shaper (i.e., a signal shaper that includes both transmit and receive-channel compensators) can be modified to selectively modify drive or receive functions by this method. In addition, both a transmit-signal compensation and a receive or echo-response compensation can be applied simultaneously.

Those skilled in the art should further appreciate that multiple harmonic receive functions may be observed within the available bandwidth of a single transducer response by implementing multiple receive-filter functions each centered about a corresponding harmonic of the fundamental or transmit center frequency, $f_t$. (For example, the ultrasound-imaging system 10 may be configured to transmit at a fundamental frequency, $f_t$, and receive at a $2^{nd}$ harmonic spectrum centered about $2f_t$ and a $3^{rd}$ harmonic spectrum centered about $3f_t$.

It is significant to note that the aforementioned compensations to the transmit and receive spectra can be implemented by real-time digital or other filters. The compensation calculations can be made apriori and the results programmed into the appropriate filters. Moreover, the impulse response of the transducer 18, as well as a host of other transducers, may be measured and/or modeled and the results stored within each of the devices. An improved ultrasound-imaging system 10 can be programmed to access the appropriate impulse-response data to perform the compensation calculations.

Figure 4A:
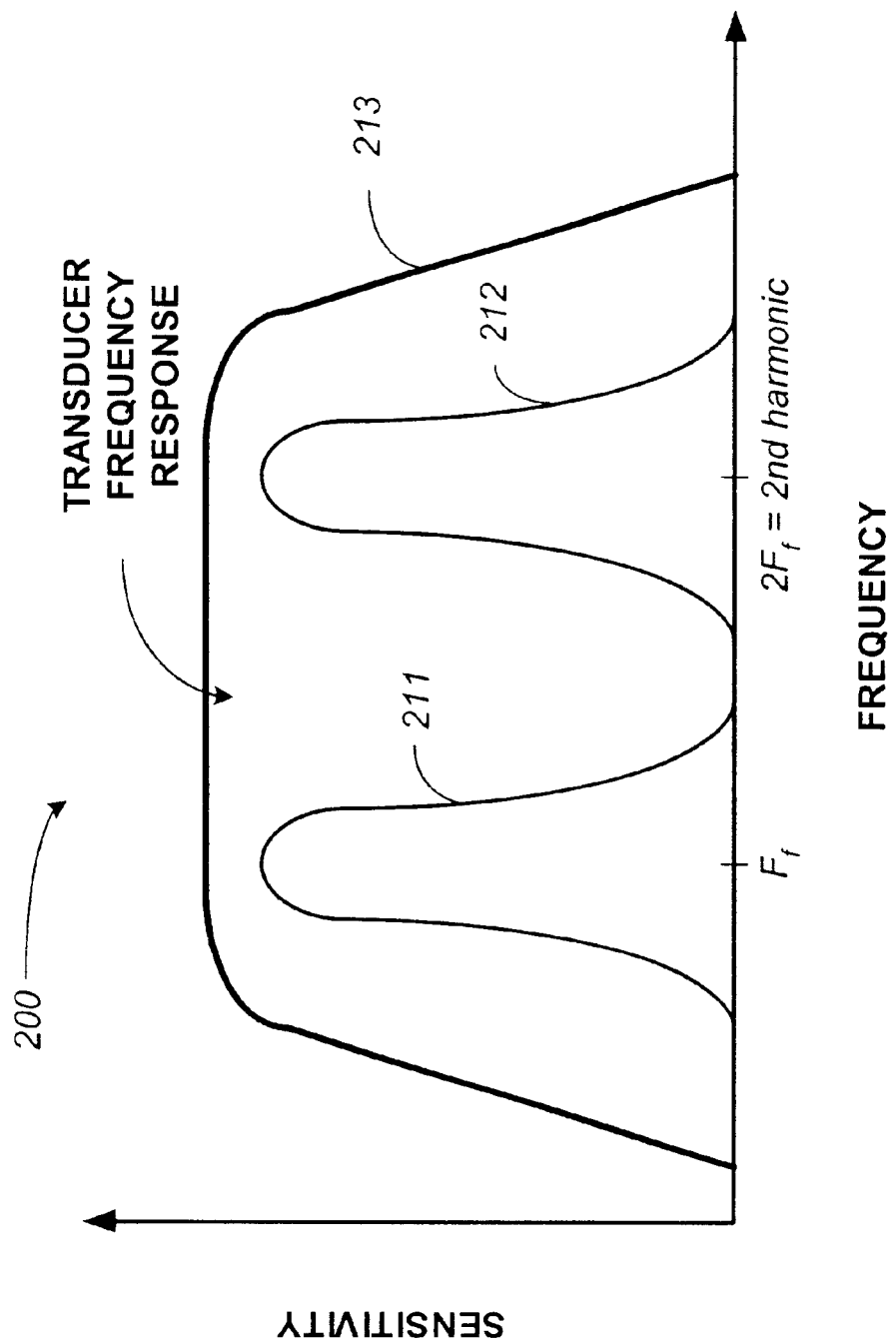
FIG. 4A is a schematic diagram illustrating an exemplary harmonic-imaging modality that may be implemented by the ultrasound-imaging system of FIG. 2.

FIG. 4A illustrates harmonic imaging via a harmonic-imaging model 200. As illustrated in FIG. 4A an ideal wideband-transducer frequency response 213 traverses a broad range of frequencies for the transducer 18 in combination with the ultrasound electronics 1 to produce a transmit-frequency spectrum 211 and receive an echo-frequency spectrum 212 with the single transducer 18. As further illustrated in FIG. 4A, the transmit-frequency spectrum 211 is centered about a fundamental transmit frequency, $f_t$. Similarly, the receive-frequency spectrum 212 is centered about the second harmonic, $2f_t$.

FIG. 4B illustrates how higher-order echo harmonics may be received by a wideband-ultrasound transducer with a relatively wide frequency response. In this regard, the harmonic-imaging model 200 illustrated in FIG. 4B includes a transducer-frequency response 210 that is wide enough given the frequency range of the transmit-frequency spectrum 211 to encompass not only a second-harmonic receive spectrum 212, but a third-harmonic receive spectrum 213 as well. It should be appreciated from the discussion above, that appropriate configured receive filters may be centered about the center frequency as defined by the $N^{th}$ harmonic of the transmit-center frequency, f(t), to generate ultrasound images.

Figure 5:
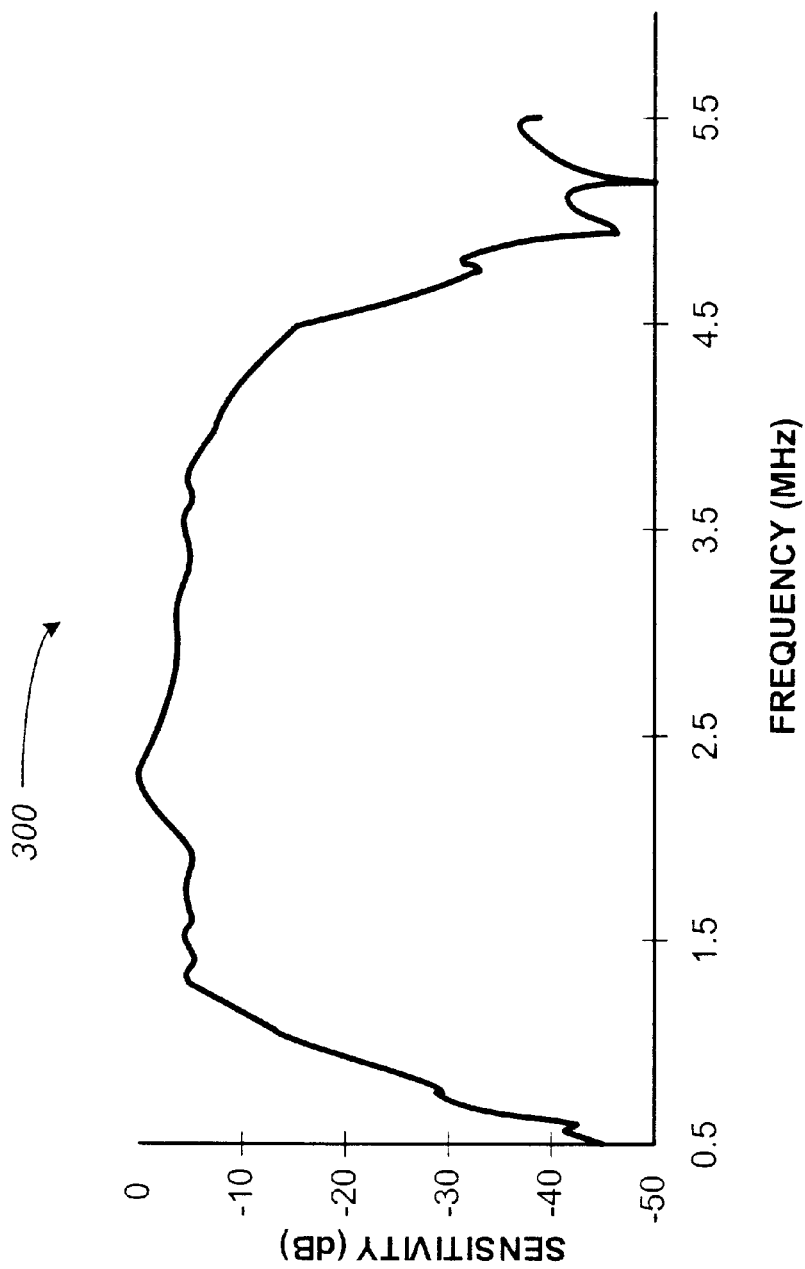
FIG. 5 is a schematic diagram illustrating an impulse response of an exemplary ultrasound transducer that may be associated with the ultrasound-imaging system of FIG. 2.

The actual frequency response 300 of an exemplary wideband transducer 18 with a center frequency of about 2.7 MHz is illustrated in FIG. 5. It is significant to note that the frequency response is not flat across the entire range of frequencies. Furthermore, the frequency response exhibits spectral fall off over a relatively small range of frequencies both at the lower and the higher limits (i.e., the edges) of the frequency response 300.

Figure 6C:
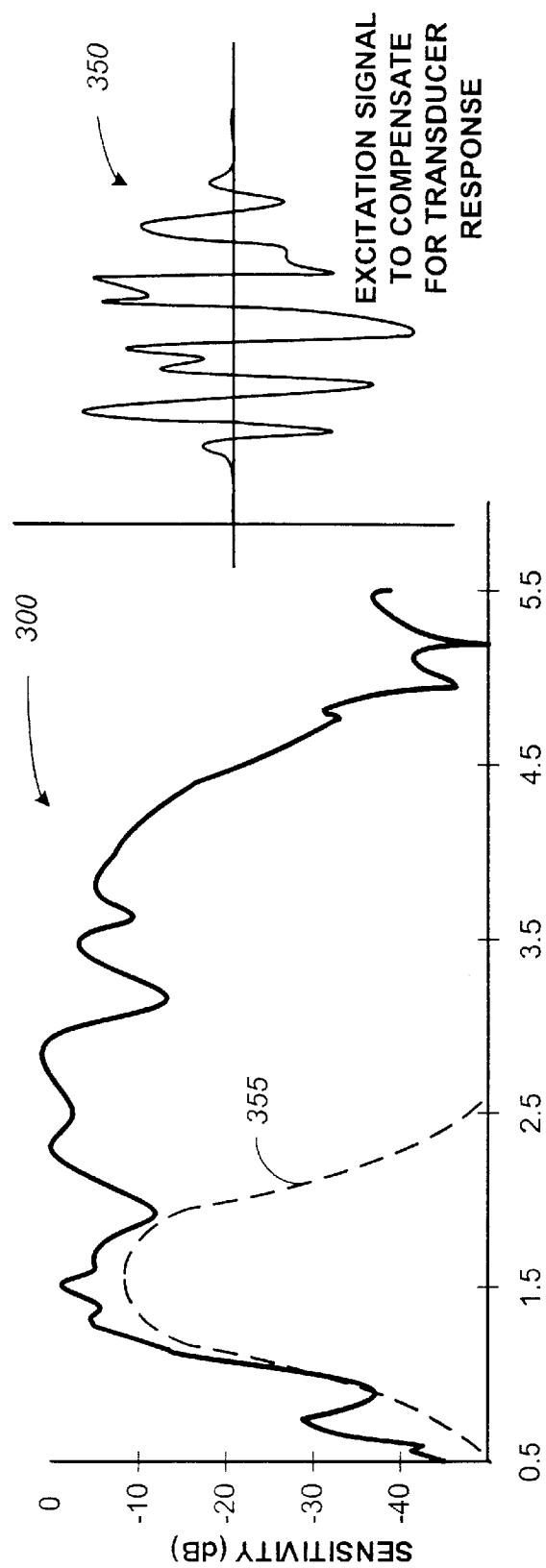

FIGS. 6A–6C illustrate the application of a time-domain transmit waveform to the actual frequency response 300 (i.e., the impulse-response of the transmit channel). A time-domain transmit signal 320 is shown to the right of the actual frequency response plot illustrated in FIG. 6A. If the actual frequency response of the transmit channel had no fall off regions and was flat across the transmit-pulse frequencies a relatively smooth acoustic transmit-frequency spectrum 211 would result. As illustrated in FIG. 6B, if the frequency response of the transmit channel remains uncompensated, the time-domain acoustic transmit waveform 320' will include an undesirable pulse tail that extends beyond the desired pulse. In the frequency domain, the actual acoustic transmit-frequency spectrum 211' is also adversely affected. As shown in FIG. 6B, the actual acoustic transmit-frequency spectrum 211' may include a harmonic-noise tail that introduces undesired transmit-channel noise in the frequency range designated for receiving tissue-induced ultrasound echoes.

FIG. 6C illustrates that a modified-excitation signal 350 in the time domain may be applied to the transducer 18 to generate a desired transmit-frequency spectrum 355. The time-domain transmit signal 350 is shown to the right of the actual frequency response plot 300 illustrated in FIG. 6C. Within the actual frequency-response plot 300 of the transducer 18 is a rendition of a realizable transmit-frequency spectrum 355. The realizable transmit-frequency spectrum 355 reduces the harmonic-noise tail and other undesirable characteristics of the actual transmit-frequency spectrum 211' (FIG. 6B) that occurs in the absence of compensation for the impulse response of the transmit channel.

Figure 7:
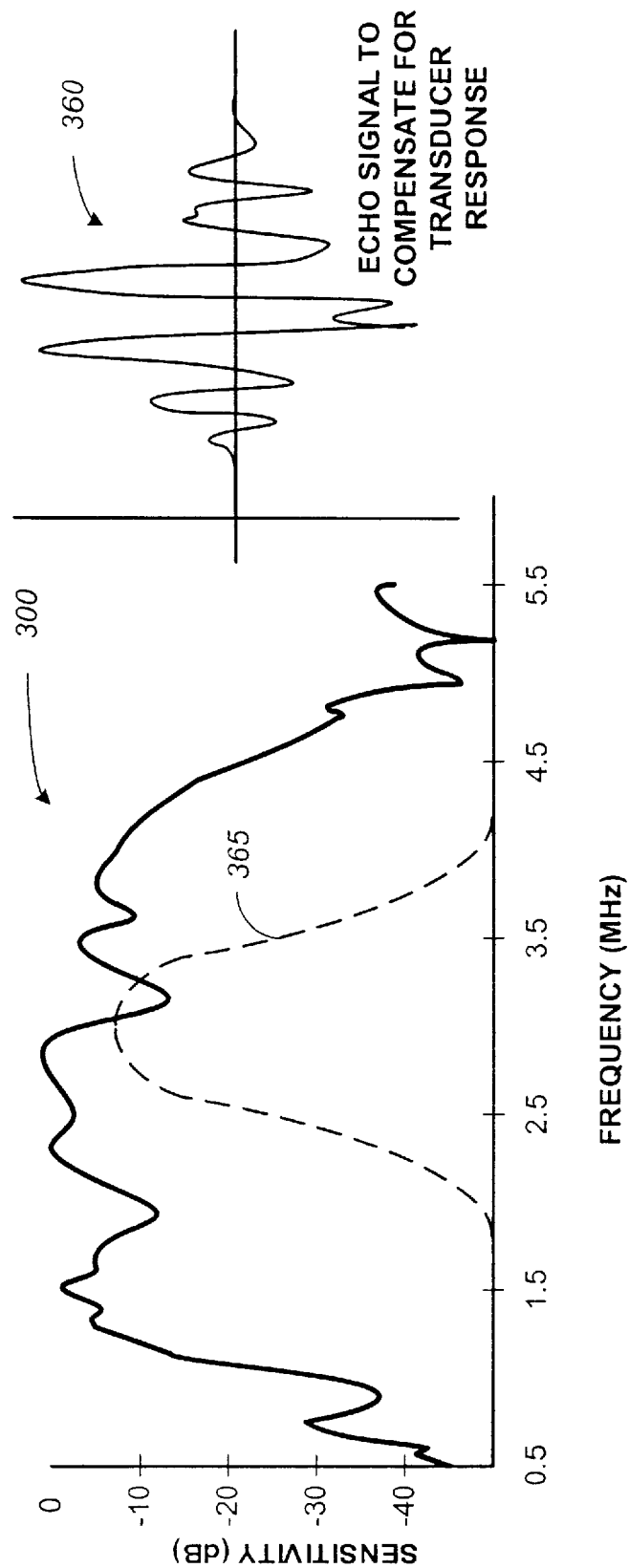
FIG. 7 presents a frequency-domain plot of a receive or echo spectrum that may be produced by the ultrasound-imaging system of FIG. 2 when the transducer receives the associated echo plot in the time domain.

FIG. 7 illustrates that an echo-response signal filter may be applied to the actual echo-response signal to generate a modified-echo response signal 360 in the time domain that is reflective of a desired receive-frequency spectrum 365. The modified echo-response signal 360 is shown to the right of the actual frequency-response plot 300 illustrated in FIG. 6. Within the actual frequency-response plot 300 of the transducer 18 is a rendition of a realizable receive-frequency spectrum 365. The realizable receive-frequency spectrum 365 reduces undesirable characteristics of the impulse response of the transducer over the receive-spectrum frequencies.

A preferred method of achieving the necessary transmit signal is by varying the transmit voltage over time. Varying the transmit voltage has the direct result of varying the pressure amplitude of the resultant transmitted-ultrasound lines 115 (see FIG. 1). Alternatively, different power levels may be accomplished by controlling the size of the aperture of the transducer 18. The aperture size may be varied in the lateral or elevation dimensions by using a synthetic-aperture methodology. The aperture may be divided into two or more groups with transmit-ultrasound lines 115 being separately fired from each group. The subsequent reflected energy is then stored. The entire aperture is then used to transmit a second incident-pressure wave with an increased energy level. The subsequent reflected energy is again stored. In this embodiment, the scaling step includes beamforming the response from the two or more smaller apertures and subtracting those results from the response due to excitation from the entire aperture to determine the non-linear response.

Another way of controlling transmitted-power levels is to fire a subset of elements in the array and compare the scaled-subset response to a response from the entire transducer array. This method should be performed in a manner to reduce and or minimize grating lobes that stem from under sampling the aperture and steering errors that result from asymmetries about the center of the aperture.

A non-limiting example of a multi-pulse technique that fires three pulses is described below. Firing the "even" numbered elements within transducer 18 may generate the first pulse. The second pulse may be generated by controllably firing all elements of the transducer 18. Firing the "odd" numbered elements may generate the third pulse. The response signal-processing portion of the ultrasound-electronics system 1 may be configured to mathematically combine a response from the first and third pulses for further mathematical manipulation with the second-response signal. It is important to note that the selection of elements to form the various element subsets for the first and third pulses is not limited to "even" and "odd" numbered elements of the transducer element array. It will be appreciated by those skilled in the art that more than three pulses may be generated and fired to further extend a multi-pulse insonification and imaging technique.

The multi-pulse technique described above serves a couple of purposes. First, adjusting the transmitted power by firing a subset of elements reduces the transmit power while providing the same voltage level to each transmission. If the transmit waveforms are not properly scaled and inverted, or if the waveforms differ in their frequency content, undesired residual artifacts from imperfect tissue-response signal cancellations may be introduced by the ultrasound-electronics system 1. By matching the voltage level used to generate the various pulses, the ultrasound-electronics system 1 reduces any undesired tissue signals introduced by mathematically combining signal responses generated from ultrasonic transmissions of varying power levels. Transmit waveform power-magnitude matching over a number of various levels of comparison across a received bandwidth of interest will serve to reduce residual-tissue response signal artifacts that may result from transmit-power mismatches.

A second important result from using the multi-pulse technique is that by mathematically combining the first-pulse response with the third-pulse response, motion of an organ-of-interest (i.e., the heart) is averaged, so that when the second-pulse response is mathematically processed (i.e., subtracted) from the combination of the first and third-pulse responses, motion is suppressed between the various pulses.

Yet another way of controlling the transmitted power levels is to use a phase-inversion technique. Phase-inversion techniques are well understood by those skilled in the art of ultrasonic imaging. The description of an ultrasonic-imaging system capable of producing, detecting, and image-processing ultrasonic responses that use phase-inversion techniques need not be described to understand the transmit-signal modifier and need not be described herein. It is significant to note, however, that mathematical post-processing of detected response signals may vary based on the desired effect of the processing and the phase of the transmitted waveforms responsible for the response signals. By coordinating one or more of the phase, intensity, and frequency content of multiple transmitted pulses with the applicable response processing, motion artifacts between pulses may be substantially reduced.

Another technique that may be used to vary the transmitted levels would be to take advantage of the beam shape of a pressure wave. Transmitted pressure waves have a reduced magnitude that varies with angular distance. As by way of a non-limiting example, if a pressure wave is transmitted at 0 degrees (from the face of the transducer-element array) and the ultrasound-electronics system 1 is configured to receive responses at 0.0 and at 0.25 degrees, the power received at 0.25 degrees will be lower since it is off the peak of the transmitted beam.

Figure 8:
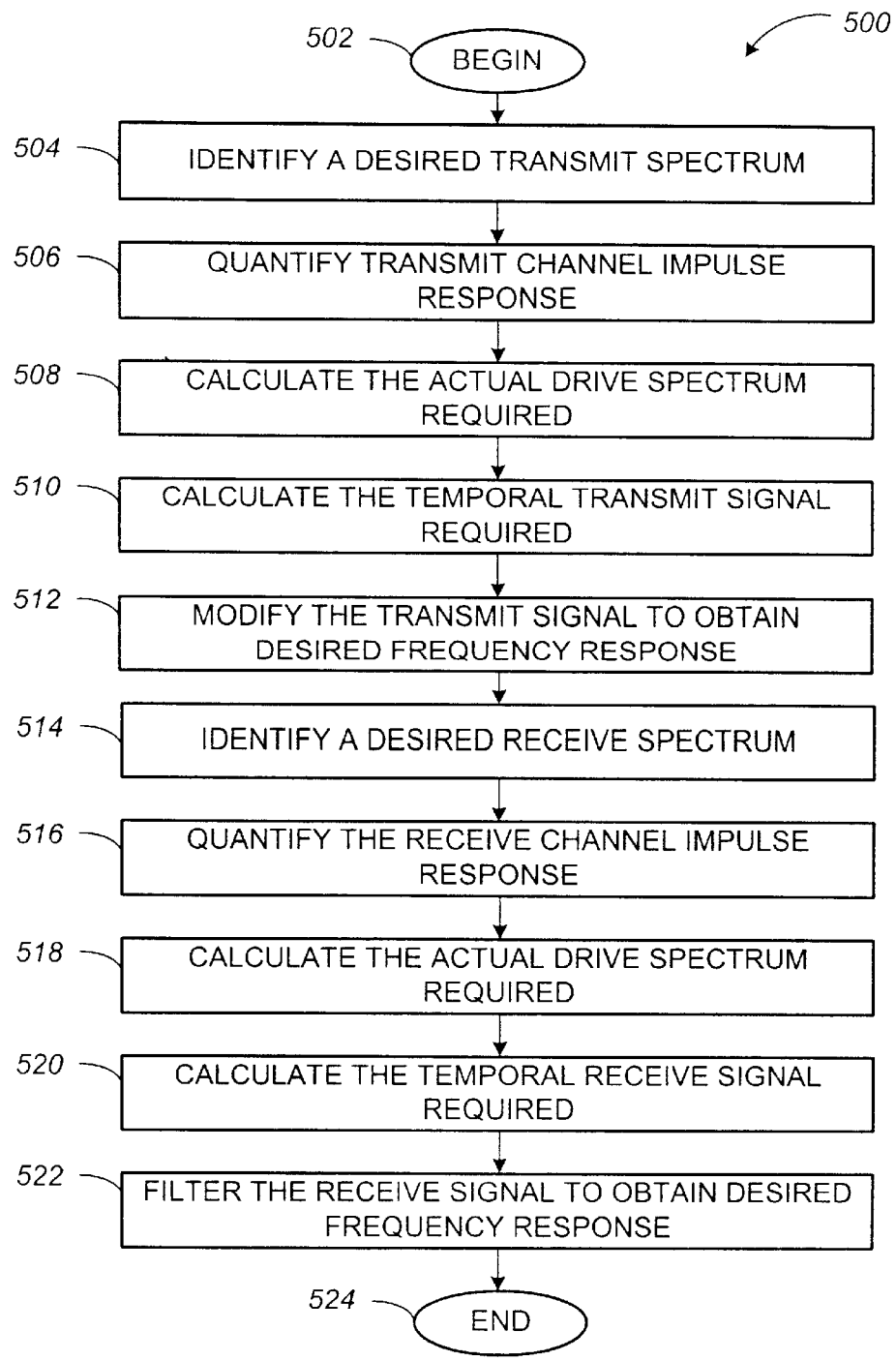
FIG. 8 is a flow chart illustrating a method for improved-harmonic imaging that may be implemented by the ultrasound-imaging system of FIG. 2.

Reference is now directed to FIG. 8, which illustrates a flowchart describing a method for improved harmonic imaging that may be implemented by the ultrasound-imaging system 10 of FIG. 2. As illustrated in FIG. 7, the method for improved harmonic imaging 500 may start with step 502, labeled "BEGIN." A desired transmit spectrum is selected as illustrated in step 504. In step 506, the impulse response of the transmit channel (including the transducer) together with the ultrasound-electronics system 1 is recorded or modeled. With the desired transmit spectrum and the impulse response of the transmit channel identified, the ultrasound-imaging system 10 calculates the actual-drive spectrum required to generate the desired transmit spectrum as shown in step 508. Once the drive spectrum is defined, the temporal-transmit signal may be determined as indicated in step 510. As shown in step 512, the ultrasound-imaging system 10 may modify the transmit signal as required to obtain the desired frequency response over the transmit-spectrum frequencies.

A desired receive spectrum is selected as illustrated in step 514. In step 516, the impulse response of the receive channel formed by the transducer together with the ultrasound-electronics system 1 over the desired receive-frequency range is recorded or modeled. With the desired receive spectrum and the impulse response of the receive channel identified, the ultrasound-imaging system 10 calculates an actual echo-response spectrum that when applied to the receive channel results in the desired receive spectrum as shown in step 518. Once the receive spectrum is defined, a temporal-receive signal may be determined as indicated in step 520. As shown in step 522, the ultrasound-imaging system 10 may filter the received ultrasound-echo signal as required to obtain the desired frequency response over the receive-spectrum frequencies. As illustrated in step 524, herein labeled "END," the method for improved harmonic imaging 500 may terminate.

It will be appreciated by those having ordinary skill in the art, the signal shaper, whether it is implemented in the form of a transmit-signal modifier 14, a receive or echo-signal shaper 28, or both, can be implemented in hardware, software, firmware, or a combination thereof within the ultrasound-electronics system 1 shown in FIGS. 1 and 2. When implemented in software, various processing routines can be stored and transported on any computer-readable medium for use by or in connection with an instruction-execution system, apparatus, or device, such as a computer-based system, processor-containing system, or other system that can fetch the instructions from the instruction-execution system, apparatus, or device and execute the instructions.

In the context of this disclosure, a "computer-readable medium" can be any means that can contain, store, communicate, propagate, or transport the program for use by or in connection with the instruction-execution system, apparatus, or device. The computer-readable medium can be, for example, an electronic, magnetic, optical, electromagnetic, infrared, or a semiconductor system, apparatus, device, or propagation medium. More specific examples of computer-readable media include the following: an electrical connection having one or more wires, a computer diskette, a random-access memory (RAM), a read-only memory (ROM), an erasable-programmable read-only memory (EPROM), an electrically-erasable-programmable read-only memory (EEPROM) or a Flash memory, an optical fiber, and a compact-disk read-only memory (CD-ROM). It is to be noted that the computer-readable medium can even be paper or other suitable media upon which the program is printed as the program can be electronically captured, via for instance optical scanning of the paper or other media, then compiled, interpreted, or otherwise processed and stored in a computer memory.

When implemented in hardware, the signal shaper can be implemented with any or a combination of the following technologies, which are all well known in the art: a discrete-logic circuit(s) having logic gates for implementing logic functions upon data signals, an application-specific integrated circuit (ASIC) having appropriate combinational logic gates, a programmable-gate array(s) (PGA), a field-programmable gate array (FPGA), etc.

It should be emphasized that the above-described embodiments of the signal shaper are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of this disclosure and are protected by the following claims.

Therefore, having thus described the invention, at least the following is claimed:

1. An ultrasound-imaging system, comprising:
   means for identifying the impulse response of a transmit channel of the ultrasound-imaging system;
   means for selecting a desired transmit channel signal spectrum, the transmit channel signal spectrum defined by an envelope and a transmit center frequency;
   means for determining an excitation signal that when applied in the transmit channel produces the selected transmit channel signal spectrum;
   means for applying the excitation signal;
   means for receiving a reflected excitation signal centered about a harmonic of the transmit center frequency;
   means for selecting a desired receive channel filter function to apply to the reflected excitation signal;
   means for identifying the impulse response of a receive channel of the ultrasound-imaging system; and
   means for formulating a receive channel filter responsive to the desired filter function and the receive channel impulse response.

2. The system of claim 1, wherein the means for selecting a desired transmit channel signal spectrum identifies a desired transmit channel signal spectrum reflective of a symmetric function.

3. The system of claim 2, wherein the symmetric function comprises a Gaussian function.

4. The system of claim 1, wherein the means for identifying the impulse response of a transmit channel determines the impulse response by measurement.

5. The system of claim 1, wherein the means for identifying the impulse response of a transmit channel determines the impulse response by calculation.

6. The system of claim 1, wherein the determining means formulates the excitation signal as a function of the impulse response and the desired transmit spectrum.

7. The system of claim 6, wherein the formulated excitation signal comprises calculating an inverse Fourier transform.

8. The system of claim 6, wherein the formulation comprises performing a deconvolution operation.

9. The system of claim 8, wherein the deconvolution operation uses a Weiner filter.

10. The system of claim 8, wherein the deconvolution operation uses polynomial time division.

11. An improved ultrasound-imaging system, comprising:
    a transducer;
    a switch coupled to the transducer, wherein the switch is positioned to apply an excitation signal to the transducer in a transmit mode of the ultrasound-imaging system, the excitation signal having a center frequency;
    a signal shaper coupled to the switch, the signal shaper configured to generate the excitation signal, the signal shaper further configured to adjust the excitation signal in response to the impulse response of the transmit channel such that a desired ultrasound energy waveform is generated by the transducer and
    a receive channel signal shaper coupled to the transducer, the receive channel signal shaper comprising a filter, the filter formulated in response to the receive channel impulse response and a desired echo response signal spectrum, the filter further configured to process the ultrasound echo response at a harmonic of the center frequency.

12. The system of claim 11, wherein the transducer has a passband capable of harmonic imaging.

13. The system of claim 11, wherein the desired ultrasound energy waveform generated by the transducer can be modeled with a symmetric function centered at a fundamental frequency.

14. The system of claim 11, wherein the echo response signal spectrum is centered about at least one harmonic multiple of the fundamental frequency of the excitation signal transmitted via the transducer.

15. A method for enhancing the axial resolution and improving transducer response sensitivity in an ultrasound-imaging system, comprising the steps of:
    selecting a desired transmit spectrum;
    quantifying the transmit channel impulse response;
    calculating a drive signal that when applied to the transmit channel will produce the desired transmit spectrum, the drive signal having a center frequency;
    applying the drive signal to a transducer;
    selecting a desired echo response spectrum;
    quantifying a receive channel impulse response;
    deriving a filter that when applied to received ultrasound echo signals will produce the desired echo response spectrum at a harmonic of the center frequency; and
    applying die filter to the received ultrasound echo signal.

16. The method of claim 15, wherein the transducer has a passband capable of harmonic imaging.

17. The method of claim 15, wherein the desired transmit spectrum generated by the transducer can be modeled with a symmetric function centered at a fundamental frequency of the drive signal.

18. The system of claim 16, wherein the received ultrasound echo signals are centered about at least one harmonic multiple of the fundamental frequency of the drive signal transmitted via the transducer.

* * * * *